US008715785B2

(12) United States Patent
Martin et al.

(10) Patent No.: US 8,715,785 B2
(45) Date of Patent: May 6, 2014

(54) METHOD FOR REINFORCING HOLLOW GLASS ARTICLES

(75) Inventors: Eric Martin, Chatillon (FR);
Jean-Michel Munos, Oslon (FR);
Frederic Mertz, Ouroux/Saone (FR)

(73) Assignee: Saint-Gobain Emballage, Courbevoie (FR)

( * ) Notice: Subject to any disclaimer, the term of this patent is extended or adjusted under 35 U.S.C. 154(b) by 1037 days.

(21) Appl. No.: 12/093,258

(22) PCT Filed: Nov. 8, 2006

(86) PCT No.: PCT/FR2006/051154
§ 371 (c)(1),
(2), (4) Date: Aug. 14, 2008

(87) PCT Pub. No.: WO2007/057597
PCT Pub. Date: May 24, 2007

(65) Prior Publication Data
US 2009/0155506 A1 Jun. 18, 2009

(30) Foreign Application Priority Data

Nov. 10, 2005 (FR) ..................................... 05 53411

(51) Int. Cl.
*B05D 3/00* (2006.01)
(52) U.S. Cl.
USPC ............ 427/425; 427/421.1; 427/195; 427/8; 427/10; 428/34.1; 428/407; 428/429; 428/441; 428/34.4; 215/6; 215/212; 65/60.1; 65/68; 65/69; 65/82; 65/83
(58) Field of Classification Search
USPC ............... 427/425, 195, 8, 10; 428/34.1, 407, 428/429, 441, 447, 517, 521; 215/6, DIG. 8, 215/212; 65/60.1, 68, 69, 82, 83, 117, 158, 65/213, 237, 238, 239, 267
See application file for complete search history.

(56) References Cited

U.S. PATENT DOCUMENTS

| 3,999,509 | A | | 12/1976 | Lucas | |
|---|---|---|---|---|---|
| 6,025,910 | A | * | 2/2000 | Lucas | ........................ 356/240.1 |
| 6,363,749 | B1 | | 4/2002 | Jenkner et al. | |
| 2004/0221615 | A1 | * | 11/2004 | Postupack et al. | ............ 65/30.14 |

FOREIGN PATENT DOCUMENTS

| EP | 1 178 021 | | 2/2002 | | |
|---|---|---|---|---|---|
| GB | 2 073 050 | | 10/1981 | | |
| GB | 2073050 | A * | 10/1981 | ............. | B65D 23/08 |
| JP | 56 155044 | | 12/1981 | | |
| JP | 04285032 | A * | 10/1992 | ............. | C03C 17/32 |
| JP | 2000 351652 | | 12/2000 | | |
| JP | 2000351652 | A * | 12/2000 | ............. | C03C 17/28 |

\* cited by examiner

*Primary Examiner* — Timothy Meeks
*Assistant Examiner* — Nathan T Leong
(74) *Attorney, Agent, or Firm* — Oblon, Spivak, McClelland, Maier & Neustadt, L.L.P.

(57) ABSTRACT

The invention relates to: 1) a process for the mass production of hollow glass articles which, when positioned beside one another with the same orientation in one and the same plane, are liable to come into mutual contact along a surface of revolution, characterized in that after they have left the annealing lehr, they are rotated through one turn at least along the axis of said surface of revolution, this surface then being coated, by a process without any solid contact, with an additional layer which reduces the coefficient of friction; 2) a hollow glass article as obtained by this process; and 3) a packaging assembly of such articles.

8 Claims, No Drawings

METHOD FOR REINFORCING HOLLOW GLASS ARTICLES

CROSS-REFERENCE TO RELATED APPLICATIONS

This application is a 371 of PCT/FR06/51154 filed Nov. 18, 2006 and claims the benefit of FR 05 53411 filed Nov. 10, 2005.

The present invention relates to hollow glass articles, especially those having certain particular shapes.

The invention relates more precisely to hollow glass articles which, when positioned beside one another with the same orientation in one and the same plane, are liable to come into mutual contact along a surface of revolution. This is especially the case of bottles that are conical in their bottom part starting from the shoulder (diameter decreasing towards the bottom) and also bottles of Bordeaux wine, bottles of Pineau des Charentes, bottles of cognac, etc. Such bottles placed vertically on their bottom on a horizontal plane can come into mutual contact along a peripheral horizontal band in the shoulder region.

Moreover, the process for manufacturing hollow glass articles generally incorporates two steps for the purpose of improving the scratch resistance of the articles, especially identical articles when they are being stored, handled (filled, etc.) and transported.

One hot treatment consists in depositing on the bottle, at about 500° C., between the I.S. (individual section) machine and the transfer wheel, a metal oxide coating, such as a tin oxide coating. This coating contributes to strengthening the skin of the glass.

Its main function is however to serve as adhesion primer for a cold coating. This is deposited on the bottles as they leave the annealing lehr, when they are at about 120° C., in a cold treatment. The cold coating is in general a polymer applied by spraying, which gives the glass surface a slippery character, protects from abrasion, prevents the formation of scratches and finally maintains the impact strength and resistance to internal pressure of the article.

However, although thus hot-treated and cold-treated, articles of the particular shapes mentioned above must not rub against one another when being stored or transported, whether they are empty or filled, or when they are undergoing a handling (filling, etc.) operation. Otherwise, it is observed on their peripheral horizontal band of mutual contact, in the shoulder region, that there is abrasion of the glass in the form of scratches and a deposit of glass powder resulting in a visible defect, called scuffing, which does not allow the articles to be used.

It is therefore necessary to use complex, lengthy and costly means, in particular for packaging the articles. Thermoformed trays, into which the bottles fit without touching one another, are used, or else suitable separators are employed for the same purpose in order to separate the bottles from one another. The use of thermoformed trays or separators requires a specific development—it constitutes an additional expense.

Moreover, it is known that the above-mentioned protective coatings on the glass, in particular the cold coating, may impede the bonding of labels. This is because it is difficult for water-based adhesives to adhere to the cold coating which is hydrophobic.

The object of the invention is therefore to eliminate the scuffing of hollow glass products of particular geometry described above, when they are stored, handled and transported in contact with one another without the use of thermoformed trays or separators. The appearance of the products must therefore be excellent and compatible with the selling of luxury products. Moreover, the bondability of labels must not be affected.

This object is achieved by the invention, one subject of which is therefore a process for the mass production of hollow glass articles which, when positioned beside one another with the same orientation in one and the same plane, are liable to come into mutual contact along a surface of revolution. This process is distinguished by the fact that after they have left the annealing lehr, they are rotated through one turn at least along the axis of said surface of revolution, this surface then being coated, by a process without any solid contact, with an additional layer which reduces the coefficient of friction.

The inventors have therefore discovered that an additional thickness of a coating for reducing the coefficient of friction, comparable to the aforementioned conventional cold coating, can suffice in preventing the formation of scratches and the deposition of glass powder in the region of mutual contact of the articles. Such a sufficient additional thickness is not visible to the naked eye and the appearance of the articles produced according to the process of the invention is compatible with the selling of luxury products (wine, perfume, etc.).

The treatment of the invention allows the hollow glass articles to be simply palletized, that is to say for example, and by way of indication, the disposition and wrapping with thermoplastic film of five superposed layers of 15×15 bottles in contact with one another, without concerns for significant scuffing after any usual transportation. Each layer is bounded by a simple cardboard element against the edges of which the bottles on the sides are in abutment. The bottles are in the most compact arrangement possible. Neither thermoformed trays nor separators, which are expensive, are used.

The treatment of the invention is localized since the surface of revolution along which the bottles may touch one another is in general a relatively narrow band at the height of the shoulder, that is to say one that represents a limited fraction of the external surface. The label bonding region or regions are unaffected and therefore any problem of labels becoming unstuck or of decoration retention is avoided.

The use of a coating process without any solid contact guarantees that a uniform and homogeneous additional layer is obtained, and therefore one with optimized optical and mechanical properties.

Preferably, said surface of revolution is coated with said additional layer in the position of the article in the optical checking machine.

According to preferred methods of implementing the process:
  said surface of revolution is coated with said additional layer by a reactive or unreactive, gas and/or liquid spray process (an aerosol, i.e. a suspension of liquid particles in a carrier gas or in air, may be employed); mention may also be made, by way of example, of non-reactive liquid spraying at a temperature of said surface of revolution between 20° C. and 100° C.; and
  said additional layer is left to dry after its application, in the absence of any solid contact with said additional layer while it is drying.

These preferred methods are carried out in a particularly practical manner by coating said surface of revolution with said additional layer in the position of the article at the last station of the optical checking machine, which must therefore rotate the article. This is because the optical checking machine comprises several checking stations that are not necessarily rotary, but some of which may be stationary. Upon leaving the last station of the optical checking machine, the article is therefore subjected to no other solid contact except that of its bottom on the conveyor. Said surface of revolution is free of any solid contact and the drying of said additional layer may take place under preferred conditions.

What is therefore preferably avoided is application and drying of said additional layer with solid contact such as its application with a rag or a porous support, such as a sponge, or drying it by wiping. What can therefore be obtained is a coating with optimal mechanical—adhesion, cohesion and abrasion resistance—properties and the most beautiful appearance.

Advantageously, the optical checking members are isolated from the zone for coating said additional layer by an air curtain.

The specific process of the invention is ideally combined with a hot treatment and a cold treatment, as mentioned in the above introductory part.

The articles are therefore preferably provided with a first coating between the I.S. machine and the transfer wheel. This hot coating consists of a metal oxide obtained by reactive chemical vapor deposition of precursors on the articles at about 500° C. The precursors used are for example $SnCl_4$ and $TiCl_4$ respectively for $SnO_2$ and $TiO_2$ hot coatings respectively. This deposition is carried out in a tunnel placed on the conveyor.

In addition, the articles are preferably provided with a second coating which reduces the coefficient of friction, after they have left the annealing lehr and before they pass into the optical checking machine.

This cold coating is of ephemeral (oleic acid, stearate) type or on the contrary is permanent (waxes or lacquers—polyethylene waxes) with respect to resistance to pasteurization and sterilization. It is applied by spraying it onto the articles at about 120° C.

The subject of the invention is also a hollow glass article which, when positioned beside a similar article of the same orientation, in one and the same plane, is liable to come in contact with the latter along a surface of revolution which has a maximum thickness of coating that reduces the coefficient of friction. Although thickness measurements are not easy, especially because the hot coating frequently has irregularities compensated for by the cold coating, the term "maximum thickness" will be understood here to mean a cold coating thickness which is substantially higher, on average at least 1.5 times higher, and up to more than 3 or even 5 times higher, than on those parts of the outer surface other than said surface of revolution.

Preferably, the hollow glass article of the invention is a bottle, flask or pot, said surface of revolution of which represents at most 50% and preferably at most 30% of the external surface. The area of contact between the articles is therefore relatively small, leaving a complementary portion of the external surface that is not coated with a thick relatively large cold treatment layer, on which surface the bonding of labels or the retention of decorations is not especially difficult.

Another object of the invention consists of a packaging assembly of hollow glass articles described above and/or obtained by the process described above, where they are empty or filled, positioned side by side with others with the same orientation in one and the same plane, in mutual contact along their said surfaces of revolution. Such a packaging assembly takes for example the form of a pallet consisting of several closely superposed layers firmly wrapped by a strong thermoplastic film. Each layer comprises a cardboard bottom with lateral extensions forming stops for the articles located on the sides of the layer. This packaging assembly is simple and inexpensive.

The benefits provided by the invention are described in the following example.

EXAMPLE

Pallets of Pineau des Charentes bottles, treated according to the invention and untreated, consisting of five superposed layers of 15×15 bottles, were transported.

All the bottles were subjected to a conventional hot and cold treatment.

The hot coating consisted of $SnO_2$ obtained by chemical vapor deposition (CVD) on the bottles at about 500° C., using an $SnCl_4$ precursor. Its approximately average thickness was 22 nm.

The cold coating was an additive-modified polyethylene wax suitable for deposition in an amount of 1.5% by weight in water on substrates at 80-150° C.

The regions of mutual contact of the bottles treated in accordance with the invention also were sprayed with polyethylene wax sold by Rohm and Haas under the reference Polyglass D4333, in an amount of 2% by weight in water. The substrate was at ambient temperature, especially between 20 and 40° C. The spraying was carried out in the last station of the optical checking machine.

The scuffing of the bottles treated according to the invention was compared with that of untreated bottles after being transported by road over a distance of about 800 km, using the following scale:
0=perfect
1=acceptable
2=borderline
3=poor.

The results are given in the table below, in the form of the percentage number of bottles in each category of rating the seriousness of the scuffing.

|  | 0 | 1 | 2 | 3 | 2 + 3 |
|---|---|---|---|---|---|
| Untreated bottles | 40.8 | 39.4 | 13.4 | 6.4 | 19.8 |
| Treated bottles | 87.5 | 11.0 | 1.4 | 0.1 | 1.5 |

The effectiveness of the treatment of the invention is thus demonstrated.

The invention claimed is:

1. A process for mass producing hollow glass articles which, when positioned beside one another with the same orientation in one and the same plane, are liable to come into mutual contact along a surface of revolution, the method comprising
   hot treating the hollow glass articles before entering an annealing lehr to apply a first coating comprising a metal oxide to the hollow glass articles,
   after the hollow glass articles have left the annealing lehr and before entering into an optical checking machine, coating the surface of revolution with a second layer comprising a polymer without any solid contact between the hollow glass articles, and
   rotating the hollow glass articles through another turn at least along an axis of said surface of revolution in the optical checking machine and
   simultaneously coating the surface of revolution with a third layer comprising a polymer that is different from the polymer comprised in the second layer at a temperature of 20° C. to 100° C., wherein the maximum thickness of the combined thickness of the second coating and the third coating of the surface of revolution is from 1.5 to 5 times higher than the combined thickness of the second coating and the third coating on a surface other than the surface of revolution, wherein the second layer and the third layer reduce the coefficient of friction between the hollow glass articles and are not visible to a naked eye, wherein the hollow glass articles are glass bottles, glass flasks, or glass pots, and wherein the surface of revolution represents at most 50% of the external surface of the hollow glass articles.

2. The process according to claim 1, wherein said surface of revolution is coated with said second layer by a reactive or unreactive, gas and/or liquid spray.

3. The process according to claim 1, wherein said second layer is left to dry after its application, in the absence of any solid contact with said second layer while it is drying.

4. The process according to claim 1, wherein regions of mutual contact of said hollow glass articles are coated.

5. The process according to claim 1, wherein the hollow glass articles are glass bottles.

6. The process according to claim 1, wherein the second coating comprises additive-modified polyethylene wax and the third coating comprises polyethylene wax.

7. The process according to claim 1, wherein the surface of revolution represents at most 30% of the external surface of the hollow glass articles.

8. The process according to claim 5, wherein the surface of revolution represents at most 30% of the external surface of the hollow glass articles.

\* \* \* \* \*